United States Patent
Lai et al.

(10) Patent No.: US 10,344,972 B2
(45) Date of Patent: Jul. 9, 2019

(54) DEVICE AND SYSTEM FOR PLASMA TREATMENT OF SOLID WASTE

(71) Applicants: IRIS S.R.L., Turin (IT); LASERLAM S.R.L., Turin (IT)

(72) Inventors: Manuel Lai, Turin (IT); Carlo Ferraro, Turin (IT); Simona Tusacciu, Turin (IT); Ilaria Schiavi, Turin (IT)

(73) Assignees: IRIS S.R.L., Turin (IT); LASERLAM S.R.L., Turin (IT)

( * ) Notice: Subject to any disclaimer, the term of this patent is extended or adjusted under 35 U.S.C. 154(b) by 747 days.

(21) Appl. No.: 14/947,074

(22) Filed: Nov. 20, 2015

(65) Prior Publication Data
US 2016/0146461 A1 May 26, 2016

(30) Foreign Application Priority Data
Nov. 20, 2014 (EM) .................................... 14194365

(51) Int. Cl.
| | | |
|---|---|---|
| F02C 3/22 | (2006.01) | |
| F23G 5/20 | (2006.01) | |
| F23G 5/44 | (2006.01) | |
| F23G 5/027 | (2006.01) | |

(52) U.S. Cl.
CPC ............... *F23G 5/027* (2013.01); *F02C 3/22* (2013.01); *F23G 5/0276* (2013.01); *F23G 5/20* (2013.01); *F23G 5/442* (2013.01); *F23G 2203/205* (2013.01); *F23G 2203/212* (2013.01); *F23G 2204/201* (2013.01)

(58) Field of Classification Search
CPC .......... F23G 5/027; F23G 5/0276; F23G 5/20; F23G 5/442; F23G 2203/205; F23G 2203/212; F23G 2204/201; F02C 3/22

USPC ...................................... 110/250; 34/90, 380
See application file for complete search history.

(56) References Cited

U.S. PATENT DOCUMENTS

| | | | | |
|---|---|---|---|---|
| 4,037,043 A |   | 7/1977 | Segsworth | |
| 5,136,137 A | * | 8/1992 | Schlienger | C03B 5/005 110/246 |
| 5,666,891 A | * | 9/1997 | Titus | A62D 3/19 110/250 |
| 5,771,818 A | * | 6/1998 | Tada | F23G 5/085 110/250 |
| 5,779,991 A | * | 7/1998 | Jenkins | B01D 53/32 422/186.04 |
| 5,827,012 A |   | 10/1998 | Circeo | |

(Continued)

FOREIGN PATENT DOCUMENTS

EP 3023693 A1 * 5/2016 ........... F23G 5/0276

*Primary Examiner* — Stephen M Gravini
(74) *Attorney, Agent, or Firm* — Robert L. Stearns; Dickinson Wright PLLC

(57) ABSTRACT

A device for plasma treatment of solid waste includes:
- a casing defining a treatment volume;
- a plasma torch including a first electrode and a second electrode that face into the treatment volume;
- an inlet port for intake of solid waste to be treated;
- an outlet port for disposal of inert solid products of reaction;
- a supply port for intake of a gas for supplying the aforesaid plasma torch; and
- a discharge port for discharge of gaseous products of reaction. The first electrode and the second electrode are arranged opposed to one another, and the casing is mounted rotatable about an axis of rotation. A treatment system is also provided incorporating the treatment device.

16 Claims, 1 Drawing Sheet

(56) References Cited

U.S. PATENT DOCUMENTS

| | | | | |
|---|---|---|---|---|
| 6,018,471 | A * | 1/2000 | Titus | A62D 3/19 363/126 |
| 6,355,904 | B1 * | 3/2002 | Batdorf | B09B 3/00 110/346 |
| 6,376,739 | B1 | 4/2002 | Laflamme | |
| 6,761,858 | B2 * | 7/2004 | Schultheiss | B09B 3/00 422/186.04 |
| 2003/0206850 | A1 * | 11/2003 | Schultheiss | B09B 3/00 423/419.1 |
| 2004/0012199 | A1 | 1/2004 | Beach | |
| 2005/0120715 | A1 * | 6/2005 | Labrador | F01K 27/00 60/618 |
| 2005/0204969 | A1 * | 9/2005 | Capote | B09B 3/005 110/341 |
| 2006/0075945 | A1 * | 4/2006 | Batdorf | F23G 5/085 110/250 |
| 2008/0209807 | A1 * | 9/2008 | Tsangaris | C10J 3/20 48/89 |
| 2009/0165375 | A1 * | 7/2009 | Abate | F23G 5/0276 48/65 |
| 2010/0206248 | A1 * | 8/2010 | Mok | C10L 3/00 122/17.1 |
| 2011/0079171 | A1 * | 4/2011 | Capote | F23G 5/006 110/250 |
| 2011/0296758 | A1 * | 12/2011 | Lersch | F23G 5/0276 48/89 |
| 2016/0146461 | A1 * | 5/2016 | Lai | F23G 5/0276 60/39.465 |
| 2016/0305320 | A1 * | 10/2016 | Orellana Hurtado | F02C 3/165 |

\* cited by examiner

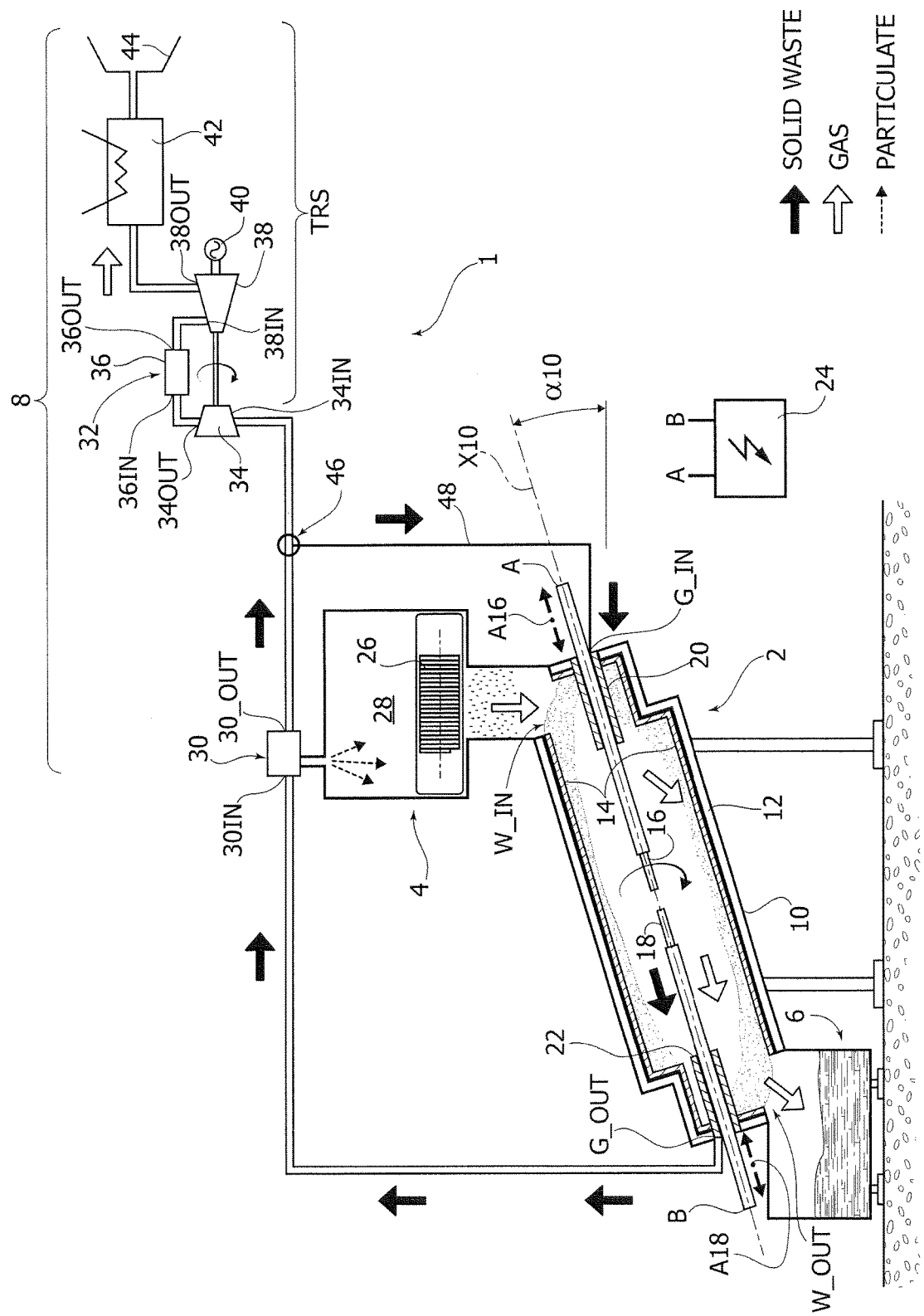

DEVICE AND SYSTEM FOR PLASMA TREATMENT OF SOLID WASTE

CROSS REFERENCE TO RELATED APPLICATION

This utility application claims priority to European Patent Application No. 14194365.4, filed Nov. 21, 2014, and is incorporated herein by reference.

BACKGROUND OF THE INVENTION

1. Technical Field

The present invention relates to systems for plasma thermal microtreatment of any type of solid waste on any scale, by means of pre-treatment of the waste and pyrolysis through exposure to plasma.

2. Related Art

It is known that the plasma treatment of solid waste is in theory very effective in so far as sublimation, pyrolysis (in the absence of oxygen), or gasification (in the presence of a limited amount of oxygen) at an extremely high temperature of the organic materials (whether natural ones or synthetic ones), melting of the metals, and melting/vitrification of inert waste are obtained simultaneously.

However, it is likewise known that the reaction that involves these phenomena does not occur generally in a complete way for thermokinetic reasons. In other words, the speed of reaction is not sufficient for integral treatment of the waste that enters the reactor, especially in the case of small-sized reactors.

The result is that of gaseous treatment products (emissions and syngases) that contain pollutants and/or not completely reacted substances (the so-called "dirty syngas") and hence require a further treatment in a separate reactor. The treatment of the waste is hence far from being optimal.

The above is further aggravated by the geometry of known reactors, which generally have a casing defining a treatment volume in which a plasma torch is set with two or more electrodes arranged side by side and separated by a discharge gap impinged upon by a supply gas of the torch itself. Neither the casing nor the configuration of the plasma torch and of the electrodes favour mixing of the waste in the reactor or exposure of the surfaces of reaction to the plasma itself (transmission of energy occurs by irradiation), aggravating the effects of the low kinetics of reaction.

SUMMARY OF THE INVENTION

The object of the present invention is to overcome the technical problems mentioned previously. In particular, the object of the invention is to provide a device and a system for plasma thermal treatment of any type of solid waste that enables treatment of the waste in a complete way, maximizing mixing and exposure thereof to the plasma itself. A further object of the present invention is the production of clean syngas.

The object of the invention is achieved by a device for plasma thermal treatment of solid waste and a corresponding treatment system having the features specified in the appended claims, which form an integral part of the technical disclosure provided herein in relation to the invention.

In particular, the object of the invention is achieved by a device for plasma treatment of solid waste, the device comprising:

a casing defining a treatment volume;
a plasma torch including a first electrode and a second electrode facing into said treatment volume;
an inlet port for the intake of solid waste to be treated;
an outlet port for disposal of inert solid products of reaction;
a supply port for intake of a supply gas for said plasma torch; and
a discharge port for discharge of gaseous products of reaction,
the device being characterized in that said first and second electrodes are arranged opposed to one another, and
in that said casing is mounted rotatable about an axis of rotation.

The object of the invention is moreover achieved by a system for plasma treatment of solid waste including:

a treatment device according to one or more embodiments of the invention;
a device for feeding solid waste configured for feeding shredded waste to said inlet port of said treatment device;
a re-circulation duct for discharge of gaseous products of reaction that is in communication with said supply port of said plasma torch; and
an after-treatment assembly including a trap for particulate matter configured for receiving gaseous products of reaction from said discharge port of said device, and a thermal-recovery system configured for receiving and carrying out energy exploitation of the gaseous products of reaction that are not intended for re-circulation to the supply port of said plasma torch.

THE DRAWING

The invention will now be described with reference to the annexed sole drawing FIG. 1, which is provided purely by way of non-limiting example and is a schematic illustration of a treatment system and device according to the invention.

DETAILED DESCRIPTION

With reference to FIG. 1, the reference number 1 designates as a whole a system for treating solid waste by means of plasma according to various preferred embodiments of the invention. The treatment system 1 includes a device 2 for plasma thermal treatment of solid waste (which is in what follows will be referred to, for brevity, as "treatment device"), a feeding device 4 for solid waste, a reservoir for collecting inert products of reaction designated by the reference number 6, and an assembly for after-treatment of gaseous products of reaction designated by the reference number 8.

The treatment device 2 includes a casing 10, preferably having a cylindrical shape, which is hollow to define a treatment volume for solid waste. The casing 10 is preferentially of the double-walled type so as to define a gap 12 for passage of a cooling liquid, and moreover has the inner wall (i.e., the one facing the treatment volume) lined with a refractory material 14 for shielding the material of the casing 10 (generally steel) against the high temperatures that are generated during treatment.

The casing 10 has a longitudinal axis X10 and is mounted rotatable about this axis. For this purpose, the casing 10 includes a first end plate 10A and a second end plate 10B, which comprise a non-rotatable central portion centred on the axis of rotation X10, and an annular peripheral portion that surrounds the central portion, is rotatable about the axis X10, and is connected to the rest of the casing 10.

The seal between the two portions is provided by devices per se known, such as shielded bearings or sliding seals. Furthermore, the axis X10 is inclined with respect to a horizontal direction by an angle α10 comprised between 0° and 90°, preferentially between 0° and 45°.

In some embodiments, it is possible to mount the casing 10 on adjustable supports that enable variation of the angle α10.

Set within the treatment volume of the device 2 is a plasma torch including a first electrode 16 and a second electrode 18, which face into the treatment volume and are arranged coaxial with respect to one another and share the axis X10. Furthermore, the electrodes 16, 18 are set opposed to one another along the axis X10. In particular, the first electrode 16 is set in the first end plate 10A in the respective fixed central portion, whereas the second electrode 18 is set in the second end plate 10B, once again in the respective fixed central portion.

The electrodes 16, 18 are made of conductive material, preferentially tungsten or graphite, and at least one of them is mounted axially movable along the axis X10 so as to vary the relative distance thereof and consequently vary the width of the discharge gap comprised between them. Preferentially, both of the electrodes are axially movable along the axis X10 in order to reduce the maximum travel of each electrode so as to cover the entire range of widths of the discharge gap required. For this purpose, each electrode is operatively connected to an actuator assembly (not illustrated, in so far as it is per se known: it is, for example, possible to use a screw-driven linear actuator or a pneumatic actuator, or else an oleodynamic actuator).

Preferentially, the electrodes 16, 18 are provided as cylindrical bodies of dimensions comprised between 0.5 cm and 25 mm in diameter and between 1 cm and 30 cm in length.

Each electrode 16, 18 may be coupled to the corresponding end plate 10A, 10B by being mounted in a respective jacket 20, 22. The jackets 20, 22 are fixed to opposite axial ends of the casing 10 and are provided as bushings integrating one or more orifices (with corresponding ducts) that define operating ports of the treatment device 2.

The jackets 20, 22 may themselves constitute the central portions of the end plates 10A, 10B of the casing 10 and bear all the ports/orifices for inlet and outlet of gas. They may moreover possibly bear the ports for inlet of the waste and outlet of the inert residue.

In particular, in the embodiment represented in FIG. 1 the jacket 20 bears a supply port G_IN for the inlet of a supply gas for the plasma torch. The jacket 20 thus forms a nozzle of the plasma torch, which is supplied with the gas entering the supply port G_IN. This gas consists, as will be seen in what follows, of particulate-filtered syngas.

Provided, instead, in the jacket 22 is a discharge port G_OUT for outlet of the raw syngas (gaseous products of reaction). The discharge port has an annular geometry and is coaxial to the electrode 18 (i.e., the electrode in an opposite position with respect to the port G_IN).

In alternative embodiments, the jackets 20, 22 may constitute a component that is physically distinct from the fixed central portion of the end plates 10A, 10B so that the aforesaid ports may be formed directly on the central portions of the end plates instead of by the jackets. Nevertheless, the port G_IN for intake of the supply gas will be always provided on the jacket 20.

Further operating ports may be instead provided both in the fixed central portions of the end plates 10A, 10B and in areas of the casing 10 involved in the rotary movement (for example, the annular peripheral portions of the end plates 10A, 10B or the cylindrical surface of the casing 10), namely:

an intake port for of pre-treated solid waste W_IN; and
an outlet port W_OUT for disposal of residue of treatment of inert solid waste, in particular after its vitrification.

More in general, it may be noted how the ports W_IN and W_OUT are preferentially located at opposite ends of the casing 10.

In the embodiment illustrated in the FIGURE, the port W_IN is set in the top part of the treatment device 2, in an area interested by the rotational movement, whereas the port W_OUT is set at the base of the treatment device 2, once again in an area involved in the movement of rotation.

From this it should be noted that the position of the ports W_IN and W_OUT varies continuously during rotation of the casing 10: the ports W_IN and W_OUT remain closed during rotation, but, in the position of waste loading/inert residue disposal (illustrated in FIG. 1), they occupy the aforesaid positions on account of the arrangement of the feeding device 4 and of the reservoir 6. This entails the need to load the waste and unload the inert solid residue when the casing 10 is stationary.

If, instead, the ports W_IN and W_OUT are provided in the fixed central portion (i.e., the non-rotating portion) of the end plates 10A, 10B (whatever this may be: jackets 20, 22 or a distinct element), the device 2 can receive the waste and dispose the inert residue even without stopping the casing 10 (and/or can operate with continuous loading and disposal).

In alternative embodiments, it is moreover possible to carry out loading of waste and disposal of inert residue simply by providing the axial ends of the casing 10 as openable end plates.

As may be seen in the schematic representation of FIG. 1, the system 1 moreover includes an electric generator 24, the terminals of which A, B are connected to the electrodes 16 and 18, respectively.

The actuator assemblies that control axial movement of the electrodes 16, 18 (or the actuator assembly, in the case where the mobile electrode is just one) are moreover operatively connected to a control unit that controls operation thereof.

In particular, the above control unit is configured for driving the actuator assemblies (or actuator assembly) in such a way as to vary the distance between the electrodes 16, 18 in order to keep the characteristics of the electric discharge and consequently of the plasma between them unaltered, as will be seen more clearly in what follows. The actuator assemblies are represented schematically in FIG. 1 as a dot and two collinear arrows with opposite orientations (that indicate the possible movements thereof) and are designated by the reference A16 (for the electrode 16) and the reference A18 (for the electrode 18).

The solid waste feeding device 4 includes a shredder 26 located on the bottom of a hopper 28, which in turn is fed by a device for supplying pre-treated solid waste per se known and not described in the FIGURE. One such device will be mentioned briefly in what follows.

The solid waste feeding device 4 moreover includes an interface for connection with the inlet port W_IN for enabling convenient loading of the waste into the treatment volume. In the case where the casing 2 is provided with openable end plates, this interface can be obtained as a simple chute.

The after-treatment device 8 includes:

a trap 30 for particulate matter, where by the term "particulate matter" is meant the ensemble of the solid particles in suspension in the gaseous products of reaction.

The device for energy exploitation of the pure syngas comprises:

- a combustion turbomachine 32, in turn including a compressor 34, a combustor 36, and a turbine 38, which is mechanically connected to the compressor 34 and has an output shaft mechanically connected to an electric generator 40;
- a heat exchanger 42; and
- an exhaust 44 to the atmosphere.

The trap 30 is basically configured as a mechanical trap, i.e., a filter element that is pervious in regard to gas but is able to withhold solid particles. For instance, there may be used a trap with blind channels permeable to gas or else one or more cyclone de-dusters, or else again electrofilters or bag filters.

The trap 30 includes an inlet 30IN in fluid communication with the discharge port G_OUT and an outlet 30_OUT in fluid communication with a re-circulation valve 46. The re-circulation valve 46 is hence set downstream of the trap 30 and coincides with the origin of a channel for re-circulation of the syngas designated by the reference number 48. The channel 48 gives out into the supply port G_IN.

The re-circulation valve 46 is moreover in view of a second duct by means of which the syngas that is treated by the trap 30 and is not intended for re-circulation is sent to an intake port 34IN of the compressor 34. This means that there exists a fluid communication between the trap 30 and the compressor 34.

A delivery port 34OUT of the compressor 34 is in turn connected to an inlet 36IN of the combustor 36, whereas an outlet 36OUT of the combustor 36 is fluid-dynamically connected to an inlet port 38IN of the turbine 38.

A discharge port 38OUT of the turbine 38 is finally connected to the heat exchanger 42 so as to carry thereto the gas that traverses it. Connected then to the outlet of the heat exchanger 42 is the exhaust 44.

It will consequently be appreciated that the ensemble of the turbomachine 32, the generator 40, and the heat exchanger 42 defines a thermal-recovery system TRS, which, as will be seen hereinafter, is configured for receiving and carrying out energy exploitation of the gaseous products of reaction that are not intended for re-circulation towards the supply port G_IN of the plasma torch.

Operation of the device 2 and of the system 1 as a whole will now be described. As has been said, in order to facilitate understanding, in FIG. 1 the paths of the various species within the system 1, i.e., the solid waste, the syngas, and the particulate matter, have been indicated in a different way.

In particular, the white arrows with black outline indicate the path of the solid waste, whereas the black arrows indicate the path of the syngas. A small group of dashed arrows indicates, instead, the path of the particulate matter leaving the trap 30.

The solid waste to be treated by means of the system 1 may be first stored in a storage tank, from which it is sent into a first shredder module or sent on directly by a chute to the shredder system where it is then separated for recovery of recyclable materials (for example, metals).

From here a conveyor carries the pre-treated waste into the hopper 28, where it is shredded again by the shredder 26 so as to reach the size required by the type of treatment carried out by the system 1. The above sequence is in any case to be considered as provided purely by way of example: other modalities are possible for supply of the waste to the hopper 28.

In the case where the port W_IN is subjected to rotation about the axis X10 or in the case where it is replaced by an openable end plate, the waste is loaded into the device 2 via connection of the port W_IN to the feeding device 4 or else via supply through the openable end plate while the device 2 is stationary. After this, the port W_IN is closed, and the motor assembly that drives the casing 10 in rotation is started. This motor assembly may be of any known type, for example an electric motor with belt or chain transmission.

In the case where the port W_IN is provided on the fixed central portion, then it is also possible to feed the waste using the feeding device 4 after rotation has already been started and even during the treatment itself.

The electrodes A, B are then supplied by means of the generator 24 with a voltage preferentially ranging between 5 and 80 V in such a way as to generate an arc discharge between them. Simultaneously, a supporting gas extraneous to the system is introduced through the supply port G_IN for ignition of the plasma torch. This introduction of gas is needed only to spark off the torch, since, as will be seen, the plasma torch is self-sustaining thanks to the use, as supply gas, of the syngas produced by the reaction of pyrolysis of the waste.

During treatment, the solid waste within the treatment volume is continuously mixed as a result of rotation of the casing 10 about the axis X10, which promotes mixing thereof and exposure of a larger surface of reaction (in other words the movement of the waste within the treatment volume exposes on a statistic basis almost all the surfaces thereof to irradiation by the plasma torch).

Exposure of the waste to plasma causes simultaneously sublimation, pyrolysis of the organic materials, melting of the metal components, and melting-vitrification of the inert waste. The latter, once its vitrification is completed, can be discharged (with the casing 10 stationary) through the port WA_OUT (or the openable end plate) into the collection volume 6 in the form of vitreous waste products.

It is to be noted in this connection that the inclined arrangement of the casing 10 favours, in addition to mixing, also migration and collection of the inert waste towards the outlet port W_OUT.

During treatment of the waste, the characteristics of the plasma may change on account, for example, of the evolution of the chemical species that come to occupy the discharge area between the electrodes 16, 18, which changes the degree of ionization of the gas between the electrodes and the dielectric characteristics of the discharge area (whence the variation of the voltage across the electrodes).

In order to keep the voltage across the discharge area between the electrodes 16, 18 constant and consequently keep the characteristics of the plasma unaltered, the control unit of the actuators drives the actuator assemblies of the electrodes 16, 18 by varying the relative distance between them.

Pyrolysis of the waste exposed to plasma results in emission of gaseous products of reaction (the so-called syngases), which are evacuated through the discharge port G_OUT.

The syngas is sent by natural convection to the inlet port 30IN of the trap 30, which abates the dust and the particulate matter present in the syngas. In this way, what comes out of the trap 30 is syngas substantially without solid particles in suspension, but still contaminated by pollutant species or by species that have not completely reacted (of a gaseous nature).

The dust and particulate matter removed from the syngas are then reintroduced into the treatment volume of the device 2 through the feeding device 4, which is hence in communication with an environment for collection of the dust of the trap 30.

The (treated) syngas that comes out of the trap 30 is instead sent on to the re-circulation valve 46, by means of which it is possible to get the system 1 to function according to two different operating modes, namely:
- a first operating mode where the gaseous products of reaction (syngas) are re-circulated within the treatment volume and then sent on to the thermal-recovery system TRS only when the purification thereof is deemed to be complete; and
- a second operating mode where the gaseous products of reaction (syngas) are in part re-circulated within the treatment volume and in part (the part that is not intended for re-circulation) sent on to the thermal-recovery system TRS In the first operating mode, the valve 46 directs all the gases leaving the trap 30 towards the supply port G_IN through the re-circulation duct 48. In this way, as will be appreciated, the syngas pre-treated by the trap 30 replaces the supporting gas initially introduced into the device 2 for ignition of the plasma torch and comes to constitute itself the supply gas for the plasma torch and for treatment of the waste. Use of the syngas as supply gas for the plasma torch guarantees thermal degradation of the dangerous compounds or the compounds that have not reacted completely still present therein into simpler molecules before the gas pervades the thermal-recovery system TRS.

The system 1 is provided with buffers that enable management of the process of closed-cycle re-circulation of the syngas, making up for any possible further increase in the mass of syngas that takes place when the waste is treated with syngas that has already been re-circulated (for example, because mixing exposes surfaces and/or portions of waste previously not involved in the treatment, with consequent production of further syngas).

The valve 46 remains in an operative position such as to exclude the thermal-recovery system TRS as long as the gas that re-circulates in the system 1 (detected, for example, by means of analysers installed in the system or else defined by a certain number of re-circulation cycles carried out) has a degree of purity that is judged sufficient (purified syngas). Once this condition is satisfied, the valve 6 is switched so as to send the syngas (the originally re-circulated syngas plus the syngas possibly stored in the buffer or buffers), which by now is no longer intended for re-circulation to the port G_IN, on to the thermal-recovery system TRS. This operating mode enables to reach practically zero pollutant emissions into the atmosphere.

The second operating mode envisages that the syngas, deprived of the dust, that exits from the trap 30 reaches the valve 46 by which it is in part re-circulated into the duct 48 towards the port G_IN and in part sent on to the thermal-recovery system TRS. This second operating mode results in an easier management of the system 1, at the expense of higher pollutant emissions at the exhaust 44. In fact, the gas that enters the thermal-recovery system TRS is not completely purified from noxious species since it has undergone only a treatment of dust abatement through the trap 30.

Whatever the operating mode chosen, in the embodiment illustrated the amount of syngas that is not intended for re-circulation to the supply port G_IN is sent on to the intake port 34IN of the compressor 34. From here, a combustion process of the syngas within the turbomachine 32 starts, according to a traditional gas cycle.

The gas entering the compressor 34 is compressed by the latter and sent to the combustor 36 through the port 36IN. In the combustor 36 combustion of the syngas takes place, and the products of combustion exiting from the port 36OUT are then sent (of course in the gaseous phase) to the inlet 38IN of the turbine 38.

Here the gas expands, transferring useful work to the shaft of the turbine, which is exploited both for driving the generator 40 in rotation and for driving the compressor 34 in rotation.

The gas leaving the discharge port of the turbine 38OUT is then sent into the heat exchanger 42 where it transfers heat to a second fluid, which is then conveyed elsewhere for subsequent use.

It is to be noted that the cooling liquid itself that impinges the treatment volume may be sent into the heat exchanger 42 as second fluid (and then conveyed elsewhere), thus maximizing the energy recovery at the discharge of the system 1.

Downstream of the heat exchanger 42 the product of combustion of the syngas, which by now is substantially without pollutant species, is released into the atmosphere.

Energy exploitation of the syngas that is not intended for re-circulation is hence twofold: the energy contained therein in part is converted into mechanical work at the turbine shaft and in part is exploited for heat exchange with a further fluid.

It should be noted that in alternative embodiments it is possible to provide only the combustor 36 directly connected to the heat exchanger 42 and to the exhaust 44. In this way, the possibility of generation of electrical energy is lost on account of the absence of the turbine, to the advantage, however, of simplicity of construction and management of the system 1.

Thanks to the device 2 and to the system 1 according to the invention, it is possible to guarantee optimal and complete treatment of any pre-treated solid waste. The problems of incompleteness of the reaction of pyrolysis that affects treatment devices and systems of a known type are completely eliminated thanks to the fact that the casing 10 of the treatment device 2 is rotatable about the axis X10, which favours mixing and moreover favours a uniform distribution of the waste about the axis X10 itself during treatment. It should be noted in this connection, with reference to FIG. 1, how the shredded waste tends to distribute evenly along the walls of the treatment volume thanks to the centrifugal action produced by rotation of the casing 10.

This increases further the area of the surface of the waste as a whole exposed to plasma, which proves vital for completion of the reaction. In fact, the transfer of energy from the plasma to the waste occurs mainly by irradiation. Maximization of the surface exposed is equivalent to maximization of the irradiated surface per unit time and hence of the speed of reaction, thus favouring completion of the reaction itself and solving the problems that afflict known devices. It is to be noted that this effect adds to that of maximization of the exposed surface of each individual unit of waste due to mixing.

Thanks to the system according to the invention also the problem of emission of noxious species into the atmosphere is likewise solved. The combined action of syngas re-circulation, of the trap 30 for the particulate matter, and of the after-treatment of the syngases simultaneously with treatment of the waste enables, by further energy exploitation, gases to be obtained with an extremely low amount of residual pollutant species.

Nevertheless, the thermal-recovery system TRS enables recovery of a large share of the residual energy (at the exhaust) of the syngas, whereas another considerable amount of the energy of the syngas, which would otherwise be lost in known devices, is used for supply of the plasma torch.

It should be noted in this connection that, thanks to re-circulation of the syngas, purification thereof occurs simultaneously with treatment of the solid waste, and moreover in the same reactor without the need for further separate treatment systems.

Of course, the details of construction and the embodiments may vary widely with respect to what has been described and illustrated herein, without thereby departing from the scope of protection of the present invention, as defined by the annexed claims.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A device for plasma treatment of solid waste, the device comprising:
    a casing defining a treatment volume;
    a plasma torch including a first electrode (16) and a second electrode, which face into said treatment volume;
    an inlet port for an inlet of solid waste to be treated;
    an outlet port for disposal of inert solid product of reaction;
    a supply port for intake of a supply gas for said plasma torch; and
    a discharge port for discharge of gaseous products of reaction, and wherein
    said first and second electrodes are set opposed to one another; and
    said casing is mounted rotatable about an axis of rotation.

2. The device according to claim 1, wherein said first electrode and said second electrode are coaxial with respect to said axis of rotation and at least one of the first and second electrode is axially movable along said axis of rotation for varying a relative distance between the first and second electrode.

3. The treatment device according to claim 1, wherein said axis of rotation is inclined with respect to a horizontal direction.

4. The device according to claim 3, wherein an inclination of said axis of rotation is between 0° and 90°.

5. The device according to claim 1, wherein said casing includes a first end plate and a second end plate, which include a central non-rotatable portion that is centered on said axis of rotation, and an annular peripheral portion that surrounds said central portion and is rotatable with the casing about said axis, wherein:
    provided in said first end plate is said supply port for intake of the supply gas for said plasma torch; and
    provided in said second end plate is said discharge port for discharge of gaseous products of reaction; and
    wherein said first electrode is installed in said first end plate and said second electrode is installed in said second end plate.

6. The device according to claim 1, wherein each of said first and second electrodes has a diameter of between 0.5 and 25 mm and a length of between 1 and 30 cm.

7. The device according to claim 1, wherein said first and second electrodes are made of tungsten or graphite.

8. The device according to claim 1, wherein said casing is double-walled so that said casing includes a jacket for circulation of a cooling liquid.

9. A system for plasma treatment of solid waste, including:
    a treatment device comprising:
    a casing defining a treatment volume;
    a plasma torch including a first electrode and a second electrode, which face into said treatment volume;
    an inlet port for an inlet of solid waste to be treated;
    an outlet port for disposal of inert solid product of reaction;
    a supply port for intake of a supply gas for said plasma torch; and
    a discharge port for discharge of gaseous products of reaction, and wherein said first and second electrodes are set opposed to one another;
    said casing is mounted rotatable about an axis of rotation;
    a feeding device for solid waste configured for feeding shredded waste to said inlet port of said treatment device;
    a re-circulation duct for gaseous products of reaction in communication with said supply port of said plasma torch; and
    an after-treatment assembly including a trap for particulate matter configured for receiving gaseous products of reaction from said discharge port of said device, and a thermal-recovery system configured for receiving and carrying out energy exploitation of the gaseous products of reaction that are not intended for re-circulation to the supply port of said plasma torch.

10. The system according to claim 9, wherein said re-circulation duct for discharge of gaseous products of reaction originates downstream of said trap for particulate matter and gives out into said supply port of said plasma torch.

11. The system according to claim 9 wherein said trap for particulate matter is in communication with said feeding device for solid waste for re-introducing the particulate matter filtered from a syngas into said treatment volume.

12. The system according to claim 9, including a re-circulation valve, which is set downstream of said trap for particulate matter and in correspondence of which said re-circulation duct originates.

13. The system according to claim 9, wherein a combustion chamber forms part of a combustion turbomachine configured for being fed with gaseous products of reaction that are not intended for re-circulation, said combustion turbomachine including a compressor and a turbine mechanically connected to said compressor and to an electric generator.

14. The system according to claim 13, further including a heat exchanger in fluid communication with a discharge port of said turbine.

15. The system according to claim 9, including a voltage generator connected to said first and second electrodes and including a control unit configured for driving an axial movement of said first and second electrodes along said axis of rotation so as to keep the voltage across the area of discharge between them constant.

16. The device according to claim 1, wherein an inclination of said axis of rotation is between 0° and 45°.

* * * * *